United States Patent
Asaro et al.

(10) Patent No.: US 6,448,974 B1
(45) Date of Patent: Sep. 10, 2002

(54) METHOD AND APPARATUS FOR CHROMA KEY DATA MODIFYING INSERTION WITHOUT VIDEO IMAGE FRAGMENTATION

(76) Inventors: Antonio Asaro, 24 Berger Road, Scarborough Ontario (CA), M1D 1R9; Edward Callway, 392 Merton Street, Toronto Ontario (CA), M4S 1B3

( * ) Notice: Subject to any disclaimer, the term of this patent is extended or adjusted under 35 U.S.C. 154(b) by 0 days.

(21) Appl. No.: 09/259,372

(22) Filed: Feb. 26, 1999

(51) Int. Cl.[7] .............................................. G06T 11/40
(52) U.S. Cl. ..................... 345/591; 345/592; 345/593; 345/604; 345/641
(58) Field of Search .......................... 345/435, 590–594, 345/600, 604, 629–641; 348/587, 592, 585–591

(56) References Cited

U.S. PATENT DOCUMENTS

| | | | | |
|---|---|---|---|---|
| 5,345,313 A | * | 9/1994 | Blank | 348/584 |
| 5,469,536 A | * | 11/1995 | Blank | 345/431 |
| 5,577,179 A | * | 11/1996 | Blank | 345/435 |
| 5,621,428 A | * | 4/1997 | King et al. | 348/592 |
| 5,687,306 A | * | 11/1997 | Blank | 345/435 |
| 5,889,499 A | * | 3/1999 | Nally et al. | 345/641 |
| 5,920,659 A | * | 7/1999 | Iverson et al. | 382/298 |
| 5,953,076 A | * | 9/1999 | Astle et al. | 348/584 |
| 6,020,931 A | * | 2/2000 | Bilbrey et al. | 348/584 |
| 6,229,550 B1 | * | 5/2001 | Gloudemans et al. | 345/641 |

* cited by examiner

Primary Examiner—Jeffery Brier
Assistant Examiner—Anthony Blackman

(57) ABSTRACT

A method and apparatus for enhanced image display that substantially eliminates video image fragments include processing that begins by monitoring color data of an image to be displayed. The processing then continues by determining whether at least a portion of the image includes color data that matches a chroma key color. When at least a portion of the image includes color data that matches the chroma key color, the processing continues by adjusting the color of at least a portion of the image to produce adjusted color data such that the adjusted color data does not match the chroma key color.

18 Claims, 3 Drawing Sheets

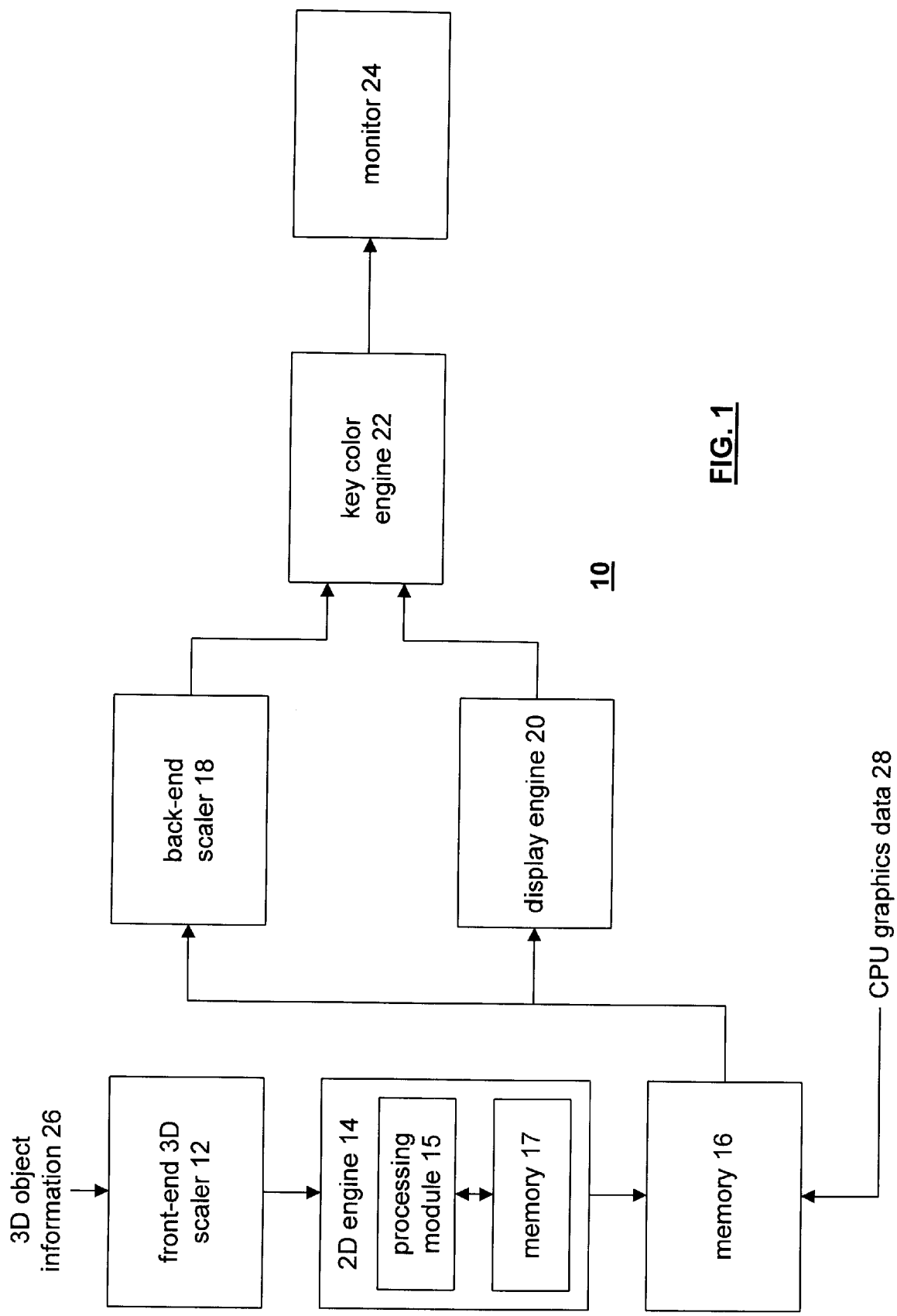

METHOD AND APPARATUS FOR CHROMA KEY DATA MODIFYING INSERTION WITHOUT VIDEO IMAGE FRAGMENTATION

TECHNICAL FIELD OF THE INVENTION

This invention relates generally to video graphics processing and more particularly to video graphics processing that includes mapped images based on chroma key coloring.

BACKGROUND OF THE INVENTION

Computers are known to include a central processing unit (CPU), system memory, video graphics processing circuitry, and peripheral ports, which allow the CPU to communicate with peripheral devices such as monitors, external memory, printers, the Internet, servers, etc. As is also known, the video graphics processing circuitry receives graphics data (e.g., word processing applications, drawing applications, etc.) from the CPU and/or video data (movies, television broadcasts, etc.) from a video source and processes such input data to produce pixel data. The video graphics processing circuitry stores the pixel data in a frame buffer, where memory locations of the frame buffer correspond to physical locations of a monitor. The correlation of the memory locations to physical pixel locations may be done linearly or in a tiled fashion.

Typically, the video graphics processing circuitry receives video data and stores it in a video capture module, which may be contained within the frame buffer. The video graphics processing circuitry also stores chroma key color data in the frame buffer corresponding to the display, where the chroma key color defines a window in which the video data will be displayed. The size and location of the window may vary based on user selections. For example, the user may select to have the video data displayed in the entire display area, in the background, in a window with a foreground position to another window displaying graphics data, or in a window with a background position to another window displaying graphics data.

An issue arises when a window displaying the video data is in a background position to a window displaying graphics data and the graphics data includes an image that has color data equivalent to the chroma key color data. When the image at least partially overlaps the chroma color data, the image will display the video data in positions that have the color data. As such, the resulting display has the effect of the video data bleeding into the foreground window.

Such an issue arises due to the architecture of video graphics processing circuitry. Such circuitry includes a scaler to scale graphics data, another scaler to scale video data, and a chroma key color module. As previously mentioned, the graphics data is stored in the frame buffer, while the video data is stored in the video capture module. The frame buffer also stores chroma key color data where the video data is to be displayed. When the pixel data is retrieved from the frame buffer, the chroma key color module monitors for the chroma key color data. When the chroma key color data is detected, the chroma key color module retrieves scaled video data from the video scaler. The chroma key color module, however, does not determine whether the chroma key color data is part of the graphics data or delineating a window for the video data. As such, video image fragments bleed through to graphics images in a foreground position.

Therefore, a need exists for a method and apparatus that enhance image displays by substantially eliminating video image fragments.

BRIEF DESCRIPTION OF THE DRAWING

FIG. 1 illustrates a schematic block diagram of a video graphics module in accordance with the present invention;

DETAILED DESCRIPTION OF A PREFERRED EMBODIMENT

Figure 2A:
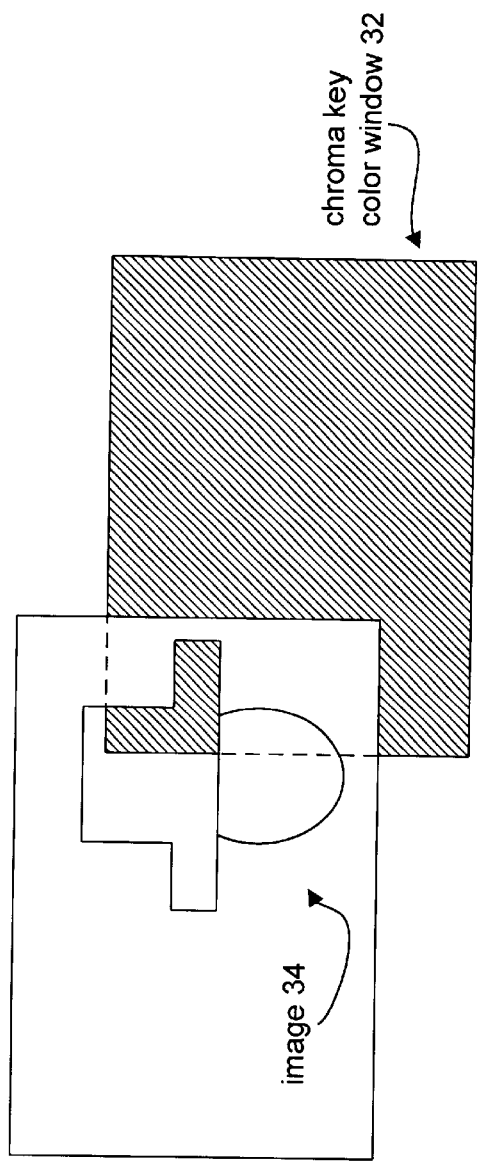
FIG. 2A illustrates a graphical representation of overlapping windows having video image fragments of the prior art.

Generally, the present invention provides a method and apparatus for enhanced image display that substantially eliminates video image fragments. Such a method and apparatus include processing that begins by monitoring color data of an image to be displayed. The processing then continues by determining whether at least a portion of the image includes color data that matches a chroma key color. When at least a portion of the image includes color data that matches the chroma key color, the processing continues by adjusting the color of at least a portion of the image to produce adjusted color data such that the adjusted color data does not match the chroma key color. With such a method and apparatus, image displays are enhanced by substantially eliminating video fragments, which are caused by the image overlaying a window for displaying video data.

The present invention can be more fully described with reference to FIGS. 1 through 4. FIG. 1 illustrates a schematic block diagram of a video graphics module 10 that includes a front end three-dimensional scaler 12, a two-dimensional engine 14, memory 16, a back end scaler 18, a display engine 20, and a key color engine 22. The key color engine outputs pixel information to the monitor 24, such that images are displayed on the monitor. The front end three-dimensional scaler 12 is operably coupled to receive three-dimensional object information 26. The three-dimensional object information 26, which may include vertex information for triangles that comprise objects to be displayed or video images, are processed via the front end three-dimensional scaler 12, the two-dimensional engine 14 and are stored in memory 16. Memory 16 may also store CPU (central processing unit) graphics data 28, which is produced by the CPU and directly written into memory 16.

The front-end scaler 12, the two-dimensional engine 14, memory 16, the back-end scaler 18, the display engine 20 and the key color engine 22, function in a similar manner as corresponding modules as in ATI International's video graphical processor marketed as the RAGE Pro™. In particular, the images that are stored in memory 16 are retrieved by the display engine 20 and the back-end scaler 18. The back-end scaler 18 is operable to retrieve video data from a video capture module (not shown), or receive the data directly, and scale it. The key color engine 22 interprets the output of the display engine 20, which corresponds to the data stored in memory 16. In particular, the data stored in memory 16 corresponds to the resulting frame of data to be displayed on the monitor 24. For example, the current frame of data may include two or more windows, where one window is to display video data from a video source such as a VCR, television broadcast, cable box, satellite receiver, DVD player, etc., while the other window is to display graphics data (e.g., word processing application, drawing application, and/or any other type of application being performed by the central processing unit). For the window that is to contain the video data, the two-dimensional engine provides a chroma key color to the memory in the corresponding memory locations that comprise the window. As such, when the display engine 20 outputs the chroma key color for the corresponding window, the key color engine 22 interprets this data and retrieves the scaled video data from the back engine scaler 18. The key color engine 22 then outputs the blended video image, within the video window, with the graphics data in the other window or windows.

To overcome the video images fragments appearing in overlaying graphical windows, the two-dimensional window 14 is modified to include a processing module 15 and memory 17. The processing module 15 may be a single processing entity or a plurality of processing entities. Such a processing entity may be a microprocessor, a microcontroller, a microcomputer, central processing unit or portion thereof, digital signal processor, existing processing devices within the video graphics controller, state machine, logic circuitry, and/or any device that manipulates signals based on operational instructions. The memory 17 may be a single memory device or a plurality of memory devices. Such a memory device may be a read-only memory, random access memory, floppy disk memory, hard drive memory, existing memory within the video graphics processing engine, external memory, and/or any device that stores digital information. Note that when the processing module 15 implements one or more of its functions via a state machine or logic circuitry, the memory storing the corresponding operational instructions is embedded within the circuitry comprising the state machine and/or logic circuitry. The operational instructions stored in memory 17 and executed by the processing module 15 will be discussed in greater detail with reference to FIGS. 3 and 4.

FIG. 2A illustrates a graphical representation of video image fragments. As shown, a chroma key color window 32 is overlaid by a graphics window that includes image 34. The image 34 includes a portion (e.g., a hat) that has color data that is equivalent to the corresponding chroma key color. Since the portion of the image overlaps the chroma key color window 32, when the key color engine 32 interprets the color data for image 34, it will errantly retrieve video data for the overlapping portion as opposed to graphics data thereby producing the video image fragments within the graphics window.

Figure 2B:
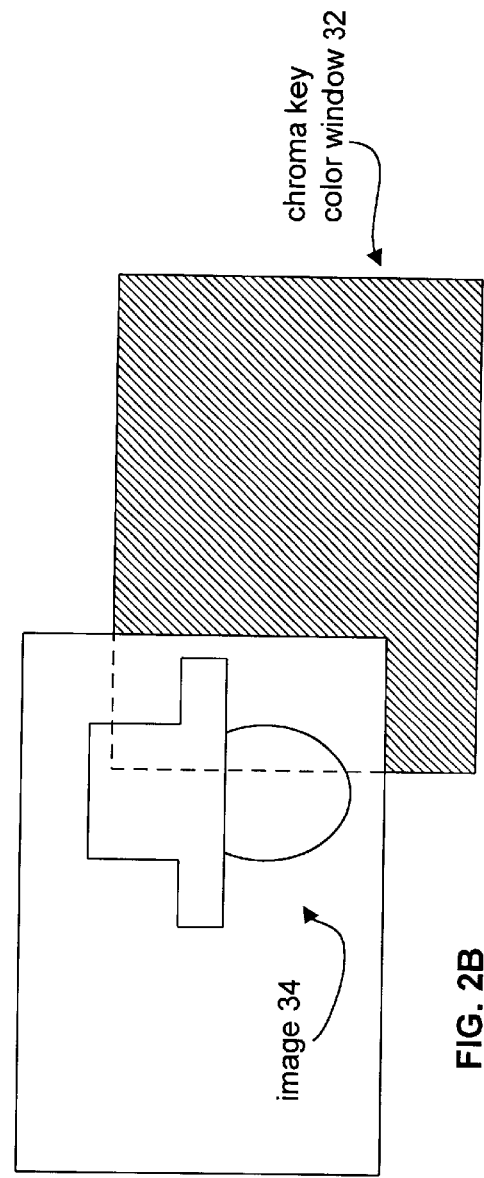
FIG. 2B illustrates overlapping images without video image fragments in accordance with the present invention.

FIG. 2B illustrates the functionality of the present invention via the processing module 15 and memory 17 of the two-dimensional engine 14. By slightly changing the color data of the portion of the image (e.g., the hat), the key color engine 22 does not detect the chroma key color within the image, and thereby does not errantly cause the video data to be displayed within the boundaries of the portion of the image (e.g., the hat). The color data may be changed by selecting a new color palette identifier that represents a color similar (i.e., a difference between the original color and the new color is not readily detectable to the human eye), by changing the RGB or YCbCr color data, or by changing a color component value of the RGB or YCbCr color data.

Figure 3:
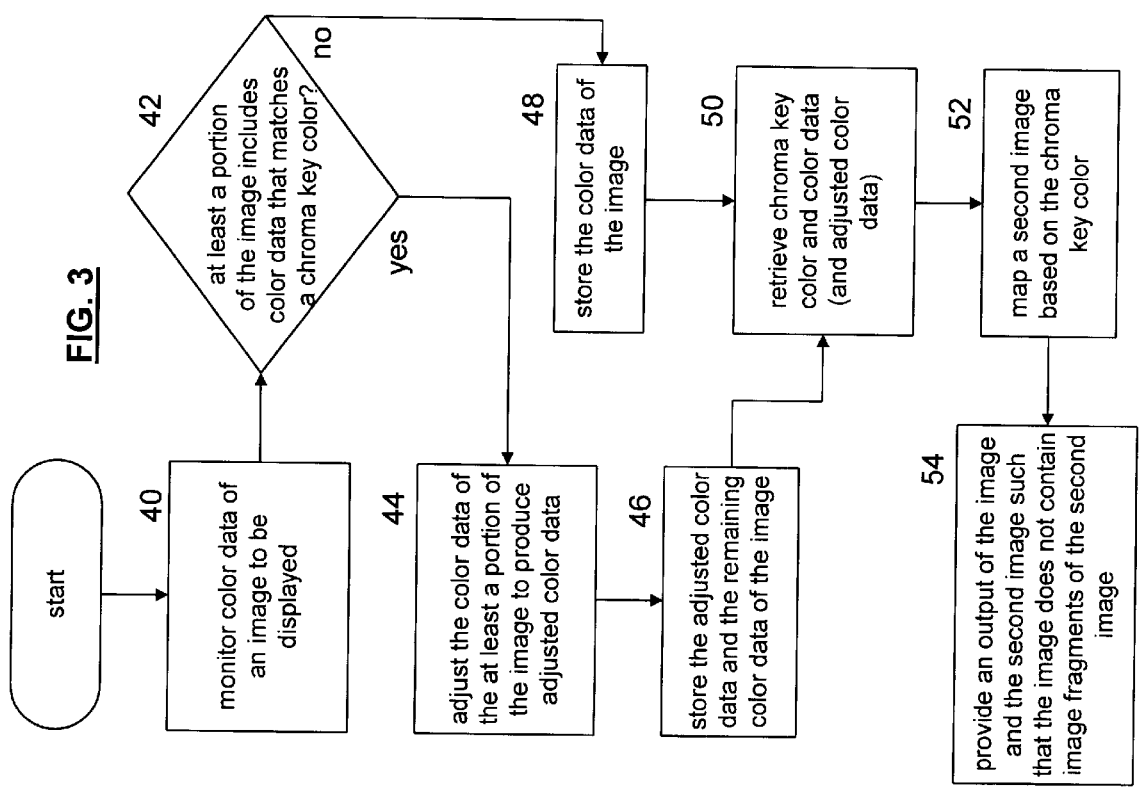
FIG. 3 illustrates a logic diagram of a method for enhance image display in accordance with the present invention.

FIG. 3 illustrates a logic diagram of a method for enhancing image display by substantially eliminating video image fragments. Such processing begins at step 40 where color data of an image to be displayed is monitored. The process then proceeds to step 42 where a determination is made as to whether at least a portion of the image includes color data that matches a chroma key color. If not, the process proceeds to step 48 where the color data of the image is stored.

If, however, at least a portion of the image includes color data that matches a chroma key color, the process proceeds to step 44. At step 44, the color data of the at least a portion of the image is adjusted to produce adjusted color data. The color data may be adjusted by toggling a least significant bit of the color data, toggling multiple least significant bits of the color data, toggling bits of the color data that are not displayed, or any other bits of the color data. The process then proceeds to step 46 where the adjusted color data and the remaining color data of the image are stored.

The process proceeds to step 50 from steps 46 and/or 48, where chroma key color data, color data and adjusted color data of the image is retrieved from the memory. The process then proceeds to step 52 where a second image is mapped into a display based on the chroma key color. Such a second image may be video data. The process then proceeds to step 54 where an output of the image and the second image are provided such that the image does not contain image fragments of the second image.

Figure 4:
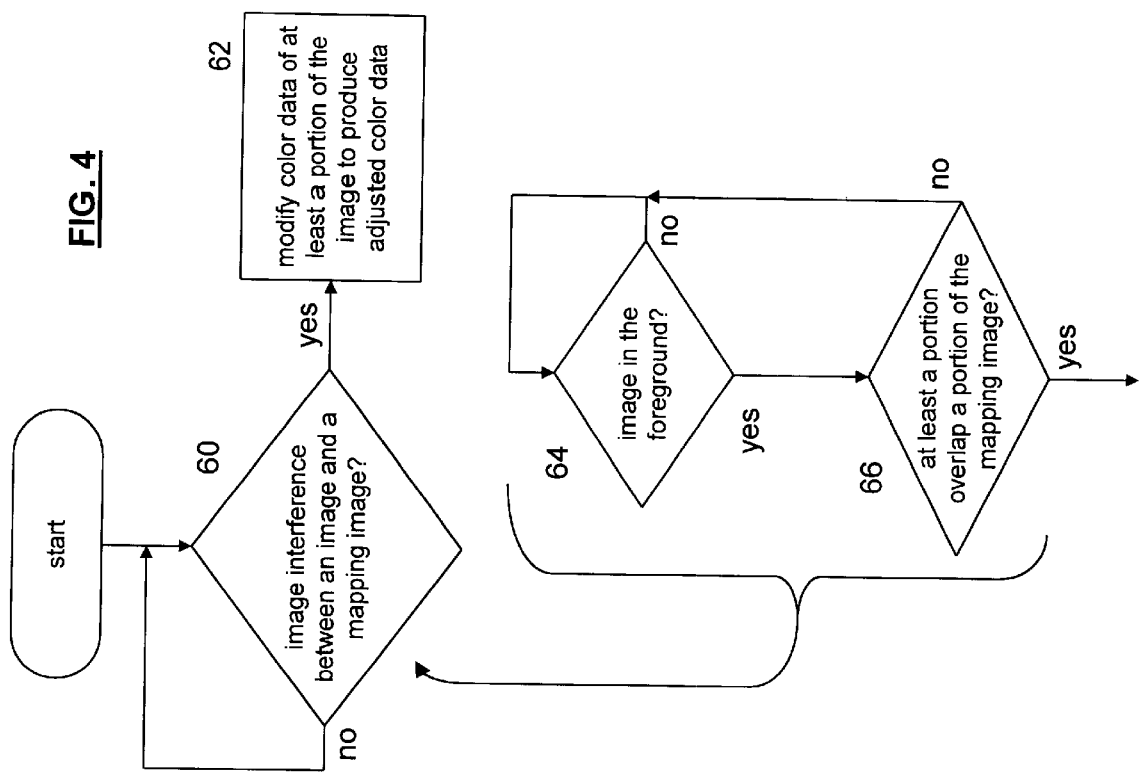
FIG. 4 illustrates a logic diagram of an alternate method for enhanced image display in accordance with the present invention.

FIG. 4 illustrates a logic diagram of an alternate method for enhanced image display by substantially eliminating video fragments. The process begins at step 60 where a determination is made as to whether image interference between an image and a mapping image occurs. If such interference occurs, the process proceeds to step 62 where color data of at least a portion of the image is modified to produce adjusted color data. The determination at step 60 may further be described with reference to steps 64 and 66. At step 64, a determination is made as to whether the image is in a foreground position with respect to a window containing chroma key color data. If so, the process proceeds to step 66 where a determination is made as to whether at least a portion of the image having color data that matches the chroma key color overlaps a portion of the mapping image (i.e., the window containing the chroma key color). If not, the process loops; if so, the process proceeds to step 62.

The preceding discussion has presented a method and apparatus for enhancing display of multiple images by substantially eliminating video image fragments. By detecting images that have color data that matches a chroma key color, the color data is slightly adjusted such that it no longer matches the chroma key color. As such, when subsequent processing in the video graphics circuit occurs, the adjusted color data is read as color data as opposed to chroma key color data which causes the video image fragments.

What is claimed is:

1. A method for enhanced image display, the method comprises the steps of:
    a) monitoring color data of an image to be displayed;
    b) determining whether at least a portion of the image includes color data that matches a chroma key color; and
    c) when the at least a portion of the image includes color data that matches the chroma key color, adjusting the color data of the at least a portion of the image to produce adjusted color data, such that the adjusted color data does not match the chroma key color.

2. The method of claim 1, wherein step (c) further comprises toggling at least a least significant bit of the color data to produce the adjusted color data.

3. The method of claim 1 further comprises storing the adjusted color data and the color data of the image not within the at least a portion of the image in memory.

4. The method of claim 3 further comprises:
    retrieving chroma key color data and the adjusted color data and the color data of the image from the memory;

mapping a second image based on the chroma key color data; and providing an output of the image and the second image such that the image does not contain image fragments of the second image.

5. A method for enhanced image display, the method comprises the steps of:
   a) determining an image interference between an image and a mapping image; and
   b) when the image interference exists, modifying color data of at least a portion of the first image to produce adjusted color data, such that the adjusted color data is different than chroma color data of the mapping image.

6. The method of claim 5, wherein step (a) further comprises:
   determining whether the image is in a foreground position with respect to the mapping image; and
   when the image is in the foreground position, determining whether the at least a portion of the image overlaps a portion of the mapping image.

7. The method of claim 5, wherein step (a) further comprises determining whether the at least a portion of the image is within similar display area as a portion of the mapping image.

8. The method of claim 5, wherein step (b) further comprises toggling a least significant bit of the color data to produce the adjusted color data.

9. A video graphics module comprises:
   processing module; and
   memory operably coupled to the processing module, wherein the memory stores operational instructions that cause the processing module to (a) monitor color data of an image to be displayed; (b) determine whether at least a portion of the image includes color data that matches a chroma key color; and (c) adjust the color data of the at least a portion of the image to produce adjusted color data when the at least a portion of the image includes color data that matches the chroma key color, such that the adjusted color data does not match the chroma key color.

10. The video graphics module of claim 9, wherein the memory further comprises operational instructions that cause the processing module to toggle a least significant bit of the color data to produce the adjusted color data.

11. The video graphics module of claim 9, wherein the memory further comprises operational instructions that cause the processing module to store the adjusted color data and the color data of the image not within the at least a portion of the image in memory.

12. The video graphics module of claim 11, wherein the memory further comprises operational instructions that cause the processing module to:
   retrieve chroma key color data and the adjusted color data and the color data of the image from the memory;
   map a second image based on the chroma key color data; and
   provide an output of the image and the second image such that the image does not contain image fragments of the second image.

13. A video graphics module comprises:
   processing module; and
   memory operably coupled to the processing module, wherein the memory stores operational instructions that cause the processing module to (a) determine an image interference between an image and a mapping image; and (b) modify color data of at least a portion of the first image to produce adjusted color data when the image interference exists, such that the adjusted color data is different than chroma color data of the mapping image.

14. The video graphics module of claim 13, wherein the memory further comprises operational instructions that cause the processing module to:
   determine whether the image is in a foreground position with respect to the mapping image; and
   determine whether the at least a portion of the image overlaps a portion of the mapping image when the image is in the foreground position.

15. The video graphics module of claim 13, wherein the memory further comprises operational instructions that cause the processing module to determine whether the at least a portion of the image is within similar display area as a portion of the mapping image.

16. The video graphics module of claim 13, wherein the memory further comprises operational instructions that cause the processing module to toggle a least significant bit of the color data to produce the adjusted color data.

17. A video graphics circuit comprises:
   a front end scaling module operable to receive image information and to generate a scaled image;
   a two-dimensional engine operably coupled to the front end scaling module, wherein the two-dimensional engine compares color data of the scaled image with a chroma key color and when color data of at least a portion of the image matches the chroma key color, the two-dimensional engine adjusts the color data of the at least a portion of the image to produce adjusted color data;
   memory operably coupled to the two-dimensional engine to store the adjusted color data and the color data of the image and to store chroma key color data for a mapping image;
   backend scaling module having an input to receive a second image, wherein the backend scaling module scales the second image to produce a scaled image;
   display engine operably coupled to the memory to retrieve the image and the chroma key color data from the memory; and
   chroma key color engine operably coupled to the backend scaling module and the display engine, wherein the chroma key color engine provides an output that includes the image and the scaled image based on the chroma key color data.

18. The video graphics circuit of claim 16, wherein the two dimensional engine further comprises a toggling circuit that toggles a least significant bit of the color data to produce the adjusted color data.

* * * * *